US010313221B1

(12) United States Patent
Leonard (10) Patent No.: US 10,313,221 B1
(45) Date of Patent: Jun. 4, 2019

(54) ENDPOINT MONITORING FOR A MESSAGING FRAMEWORK (71) Applicant: Sprint Communications Company L.P., Overland Park, KS (US)

(72) Inventor: Mark D. Leonard, Olathe, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 432 days.

(21) Appl. No.: 14/166,827

(22) Filed: Jan. 28, 2014

(51) Int. Cl.
*H04L 12/26* (2006.01)
(52) U.S. Cl.
CPC .................................... *H04L 43/50* (2013.01)
(58) Field of Classification Search
CPC ...................................................... H04L 43/50
USPC ......................................................... 709/224
See application file for complete search history.

(56) References Cited

U.S. PATENT DOCUMENTS

| | | | | | |
|---|---|---|---|---|---|
| 5,570,419 | A * | 10/1996 | Cave | ................... | H04M 3/5158 379/111 |
| 7,127,507 | B1 * | 10/2006 | Clark | ................... | H04L 43/045 709/224 |
| 7,457,855 | B2 * | 11/2008 | Fortman | ............. | H04L 12/2856 709/220 |
| 8,997,115 | B2 * | 3/2015 | Bauer | ...................... | G06F 9/544 370/229 |
| 2003/0023714 | A1 * | 1/2003 | Ziegler | ................... | H04M 3/08 709/224 |
| 2005/0220282 | A1 * | 10/2005 | Azinger | ............. | H04L 12/2697 379/112.01 |
| 2006/0217116 | A1 * | 9/2006 | Cassett | ............... | H04L 41/5009 455/423 |
| 2009/0172117 | A1 * | 7/2009 | Bedi | .................. | H04W 52/0216 709/206 |
| 2009/0264119 | A1 * | 10/2009 | De Pomian | ........... | H04W 24/08 455/424 |
| 2010/0058457 | A1 * | 3/2010 | Ormazabal | ......... | H04L 43/0852 726/11 |
| 2010/0123575 | A1 * | 5/2010 | Mittal | ................. | H04L 41/0609 340/540 |
| 2010/0281154 | A1 * | 11/2010 | Bedi | ................... | G06F 11/3476 709/224 |

(Continued)

OTHER PUBLICATIONS

IBM. (2012). Building Smarter Planet Solutions with MQTT and IBM WebSphere MQ Telemetry. Poughkeepsie, NY: IBM. Retrieved from http://www.redbooks.ibm.com/redbooks/pdfs/sg248054.pdf.*

*Primary Examiner* — Krista M Zele
*Assistant Examiner* — Timothy Sowa (57) ABSTRACT

An endpoint monitoring for a machine to machine (M2M) messaging framework system is disclosed. The system comprises a monitoring server and a monitoring application stored in a memory of the monitoring server. When executed by a processor of the monitoring server, the monitoring application queries a plurality of brokers that are communicatively coupled with a plurality of message queue telemetry transport (MQTT) clients for data regarding the rate of disconnections that occur between the brokers and the MQTT clients. The monitoring application compares the data received from the brokers and compares the rate of disconnections to data in an information data store. If a high rate of disconnections is discovered in at least one of the broker to MQTT client connections, the monitoring application takes action, for example reboots an MQTT client and/or sends a notification message.

16 Claims, 7 Drawing Sheets

(56) References Cited

U.S. PATENT DOCUMENTS

| | | | | |
|---|---|---|---|---|
| 2010/0306365 | A1* | 12/2010 | Gale | H04L 12/5855 |
| | | | | 709/224 |
| 2011/0096673 | A1* | 4/2011 | Stevenson | H04M 3/50 |
| | | | | 370/252 |
| 2011/0171952 | A1* | 7/2011 | Niu | H04L 43/0882 |
| | | | | 455/422.1 |
| 2012/0254409 | A1* | 10/2012 | Wakayama | H04W 36/22 |
| | | | | 709/224 |
| 2013/0007518 | A1* | 1/2013 | George | H04L 67/06 |
| | | | | 714/16 |
| 2013/0138737 | A1* | 5/2013 | Banks | H04L 67/02 |
| | | | | 709/204 |
| 2013/0244636 | A1* | 9/2013 | Shukla | H04W 4/00 |
| | | | | 455/418 |
| 2013/0272150 | A1* | 10/2013 | Wan | H04L 12/24 |
| | | | | 370/252 |
| 2014/0201321 | A1* | 7/2014 | Donaghey | H04L 67/2823 |
| | | | | 709/217 |
| 2014/0223000 | A1* | 8/2014 | Castro | H04L 43/08 |
| | | | | 709/224 |
| 2014/0314022 | A1* | 10/2014 | Rathnam | H04W 92/02 |
| | | | | 370/329 |
| 2014/0364114 | A1* | 12/2014 | Zhao | H04W 52/0206 |
| | | | | 455/424 |

* cited by examiner

ENDPOINT MONITORING FOR A MESSAGING FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Message queues may provide asynchronous communications between software applications, meaning the sender and receiver of a message may or may not interact with the message queue at the same time. A message placed onto the queue is stored until the recipient retrieves it. Message queues have implicit or explicit limits on the size of data that may be transmitted in a single message and the number of messages that may remain outstanding on the queue. Many implementations of message queues function internally: within an operating system or an application.

SUMMARY

In an embodiment, an endpoint monitoring system for a machine to machine (M2M) messaging framework system is disclosed. The system comprises a processor, a memory, and a monitoring application stored in the memory. When the monitoring application is executed by the processor, the monitoring application sends a query to a plurality of messaging brokers about the count of disconnections there have been between the brokers and a plurality of message queue telemetry transport (MQTT) clients. The monitoring application compares the data received from the brokers to data in an information data store. In response to comparing the data received from the brokers and the data in the information data store, wherein the data in the information data store is a count of disconnections. The monitoring application determines if there is a high amount of disconnections between at least one broker and one MQTT client. In response to finding a high amount of disconnections, the monitoring application initiates corrective action for the issue.

In an embodiment, a method of alerting for an endpoint monitoring for a machine to machine (M2M) messaging framework is disclosed. The method comprises querying a plurality of messaging brokers communicatively coupled with a plurality of message queue telemetry transport (MQTT) clients via a monitoring application stored in a memory of a monitoring server for data regarding the count of disconnections between the brokers and the MQTT clients. The method further comprises comparing the data received from the brokers to data stored in an information data store. The method further comprises determining that there is a high amount of disconnections in at least one of the broker to MQTT client connections. The method further comprises sending an alert to a workstation about the high disconnection count.

In an embodiment, a method of addressing disconnection issues for an endpoint monitoring for a machine to machine (M2M) messaging system is disclosed. The method comprises querying a plurality of messaging brokers communicatively coupled with a plurality of message queue telemetry transport (MQTT) clients via a monitoring application stored in a memory of a monitoring server for data regarding the count of disconnections between the brokers and the MQTT clients. The method further comprises comparing the data received from the brokers to data stored in an information data store. The method further comprises determining that there is a high amount of disconnections in at least one of the broker to MQTT client connections. The method further comprises sending an alert to a workstation where an engineer that is associated with the workstation is informed of the issue in the at least one broker to MQTT client connection. The method further comprises fixing the issue via the engineer that is associated with the workstation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for an endpoint monitoring for a machine to machine (M2M) messaging framework. The system comprises a monitoring server that further comprises a monitoring application that queries a plurality of messaging brokers for data regarding the count of disconnections between the brokers and a plurality of message queue telemetry transport (MQTT) clients. In an embodiment, the MQTT clients may execute in devices such as a head unit in a vehicle, a utility meter, or a mobile communication device. Once the monitoring application receives the data, the monitoring application compares the data received from the brokers to data in an information data store. In an embodiment, the information data store contains data about a count of disconnections and the historical count of disconnections using disconnection counts that have been compiled over a three week period which the monitoring application uses to calculate rates and compare to the current count of disconnections to historical count of disconnections.

The monitoring application determines whether there is an issue to address, and if there is an issue to address, the monitoring application alerts a workstation that is associated with an engineer who takes corrective action to fix the issue. In an embodiment, workstations are alerted and/or sent notifications based on the severity of the issues that are identified by the monitoring application. In an embodiment, there are three levels to denote the severity of an issue: level three, the least severe, with the current rate of connection maintaining a rate greater than ninety-five percent; level two, a moderately severe issue, wherein the current rate of connection is less than ninety-five percent, but greater than fifty percent; and level one, a highly severe issue, wherein the current rate of connection is less than fifty percent. A level one issue is the first issue that is used to alert the workstation. In an embodiment, the system is based on Message Site software which is based on message queue and MQTT software from IBM®. Compared to typical MQTT software from IBM®, the system that is described provides a historical view of performance information and possibility to take corrective action when particular thresholds are broken. Many typical IBM® message queue monitoring packages are focused on message queue managers or the interactions between message queue managers. The system involving the monitoring server, monitoring application and the MQTT clients deals with the performance of devices that come and go with dynamism.

With the monitoring server and the monitoring application communicatively coupled to an information data store, a company may be notified that a connection issue is occurring between at least one of a plurality of brokers and at least one of a plurality of MQTT clients and corrective action may be taken before the issue becomes user impacting.

Figure 1:
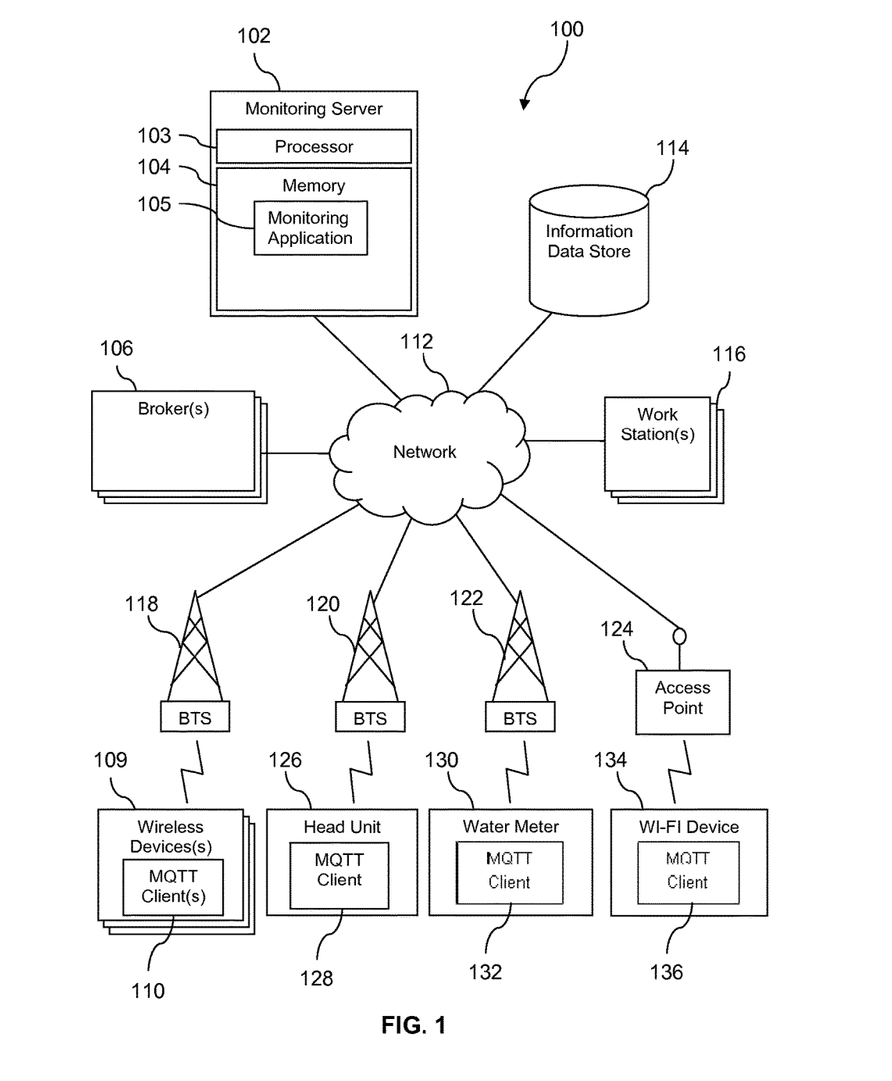
FIG. 1 is a block diagram of a system according to an embodiment of the disclosure.

Turning now to FIG. 1, a communication system 100 is described. In an embodiment, the system 100 may be based on Message Site software which is based on message queue and message queue telemetry transport (MQTT) software from IBM®. Alternatively, other messaging queue tools may be used. The system 100 comprises a monitoring server 102. The monitoring server 102 further comprises a processor 103, a memory 104, and a monitoring application 105 stored in the memory 104. The system 100 may further comprise a network 112. The system 100 further comprises a plurality of brokers 106 which are communicatively coupled to a plurality of MQTT clients 110 via the network 112. In an embodiment, the MQTT clients 110 may be embedded in and/or executing in wireless devices 109. The wireless devices 109 may comprise mobile phones, personal digital assistants (PDA), media players, in-vehicle head units, in-vehicle telematics units, or other communication enabled portable electronic devices. In an embodiment, the wireless devices 109 may be implemented as handsets. Details of handsets are discussed in more detail hereinafter.

In an embodiment, the monitoring application 105 via the monitoring server 102 may monitor millions of connections amongst the brokers 106 and the MQTT clients 110. The system 100 further comprises an information data store 114. In an embodiment the information data store 114 contains data regarding the historical count of disconnections between the brokers 106 and the MQTT clients 110. In an embodiment, the data in the information data store 114 comprises the count of disconnections between the brokers 106 and the MQTT client 110 over a period of three weeks which is the benchmark for data gathered via the monitoring application 105. In an embodiment, the information data store 114 is refreshed every three weeks using data gathered from the brokers 106 via the monitoring application 105. In an embodiment, the data in the information data store may also be refreshed every day, every two days, every week, every three weeks, an/or every quarter. The system 100 further comprises a plurality of workstations 116. In an embodiment, the workstations 116 may be associated with engineers who, when alerted of an issue via at least one of the workstations 116, may take corrective action to address the issue.

In an embodiment, the MQTT clients 110 may be communicatively coupled to the network 112 via a base transceiver station (BTS) 118. In an embodiment, while three base transceiver stations 118, 120, and 122 are used to show communicative coupling to the network 112 for the plurality of MQTT clients 110, it is understood that there may be more than three base transceiver stations used to communicatively couple the MQTT clients 110 to the network 112. In an embodiment, an example of a unit that would use a MQTT client may be a head unit 126 of a vehicle comprising a MQTT client 128 coupled to the network 112 via a base transceiver station 120 as shown in FIG. 1. In an embodiment, another example of a unit that uses a MQTT client may be a water meter 130 comprising a MQTT client 132 and is communicatively coupled to the network 112 via a base transceiver station 122 as shown in FIG. 1. In an embodiment, another unit that could use a MQTT client may be a Wi-Fi device 134 comprising a MQTT client 136 and is communicatively coupled to the network 112 via an access point 124 as shown in FIG. 1. In an embodiment, the base transceiver stations 118, 120, and 122 may link their respective devices to the network 112 as shown in FIG. 1 according to one or more of a code division multiple access (CDMA) wireless protocol, a global system for mobile communication (GSM) wireless protocol, a long term evolution (LTE) wireless protocol, a worldwide interoperability for microwave access (WiMAX®) wireless protocol, or another wireless protocol.

In an embodiment, the monitoring application 105 is executed by the processor 103 of the monitoring server 102 and proceeds to query the brokers 106 for data regarding the count of disconnections that occurs between the brokers 106 and the MQTT clients 110. In an embodiment, the monitoring application 105 sends its query out to the brokers 106 every five minutes. In an embodiment, the monitoring application 105 may send out its query to the broker about every minute, two minutes, ten minutes, thirty minutes, and/or hour.

In an embodiment, it is normal for connections between the brokers 106 and the MQTT clients 110 to open and close from time to time, but it is not normal for disconnections to occur. In system 100, the wireless links between the base transceiver stations 118, 120, 122, 124 and the MQTT clients 110, 128, 132, 136 may be considered to be relatively unreliable and are subject to a certain rate of disconnections, for example due to occasional hand-off failures, due to a temporary excessive call volume, due to transient radio interference, and due to other problems that are sometimes associated with wireless communication links. Notwithstanding, disconnections at greater than a certain frequency or proportion may be deemed "not normal."

The monitoring application 105 is searching for the count of disconnections between the brokers 106 and the MQTT clients 110. The monitoring application 105 compares the disconnections data received from the plurality of brokers 106 with the disconnections data that is stored in the information data store 114. The monitoring application 105 may process disconnection data to generate disconnection rates based on data received and/or requested from the MQTT clients 110. In an embodiment, with the disconnection data in the information data store 114, the monitoring application 105 calculates rates for comparison for the data of the count of disconnections received from the brokers 106 to historical disconnection counts. The monitoring application 105 may take corrective action if there is an unusually high amount of disconnections between the brokers 106 and the MQTT clients 110 when compared to historical counts of disconnections. In an embodiment, the corrective action initiated by the monitoring application 105 may be at least one of rebooting one of the MQTT clients 110 with a high disconnection rate, moving connection of the failing MQTT client 110 over to a different broker 106, or evaluating the internet protocol addresses to determine if there is a problem with the connectivity of the internet protocol address.

In an embodiment, the amount of disconnections per hour there are between the brokers 106 and the MQTT clients 110 is calculated by the monitoring application 105 for comparison to the historical count of disconnections. If the amount of disconnections in a broker 106 to MQTT client 110 connection exceeds a predefined threshold of the historical disconnection count as logged in the information data store 114 the monitoring application 105 may take corrective action. In an embodiment, the rate of the amount of disconnections over different periods of time during different days of the week is calculated by the monitoring application 105 for comparison to the historical count of disconnections. For example, the count of disconnections for the time period 08:00 to 14:00 on a Wednesday may be different than the count of disconnections for the time period of 16:00 to 22:00 on Sunday due to a difference in traffic on the network 112, wherein the threshold before taking corrective action set by the monitoring application 105 for Wednesday may be higher than the threshold before taking action for Sunday and vice versa. In an embodiment, predefined thresholds for disconnection counts and/or disconnection rates may be different for different time periods, different brokers, different applications, and different geographical areas (e.g. a predefined threshold for all of these factors may be lower in Billings, Mont. than in New York City, N.Y., etc.,). In an embodiment, the rate of disconnections based on the percentage of disconnections relative to the amount of active connections there are is calculated by the monitoring application 105 for comparison to the historical count of disconnections. If the amount of disconnections between the brokers 106 to MQTT clients 110 connections exceeds this percentage, the monitoring application 105 may take corrective action.

In an embodiment, the monitoring application 105 assigns a priority level to an issue if it discovers a disconnection issue between at least one of the broker 106 to MQTT client 110 connections. In an embodiment, there may be three priority levels from which the monitoring application 105 will assign to the broker 106 to MQTT client 110 disconnection issue: level three, level two, and level one, wherein the priority level progresses in severity and importance from level three to level one. Level three represents a mildly severe issue, wherein the connection rate between the broker 106 and the MQTT client 110 that is connecting greater than ninety-five percent of the time (current rate of connection>95%), wherein time is in reference to the amount of attempted connections. In an embodiment, the level three may represent a connection rate between the broker 106 and the MQTT client 110 of less than about 98% and equal to or more than about 95%. Thus, said in other words, a disconnection rate from 0% to about 2% may be considered normal and may be tolerated considering the wireless communication links may be considered to be relatively unreliable. Level two represents a moderately severe issue wherein the connection rate between the broker 106 and the MQTT client 110 is connecting less than about ninety-five percent of the time, but greater than about fifty percent of the time (95%>current rate of connection>50%). Level one represents a highly severe issue, wherein the connection rate between the broker 106 and the MQTT client 110 is less than about fifty percent of the time (50%>Current rate of connection). In an embodiment, the priority of an issue may be assigned based in the mean of disconnections, wherein the mean is the average amount of disconnections experienced between the brokers 106 and the MQTT clients 110. In an embodiment, a level three issue may be one standard deviation of disconnections above the mean. A level two issue may be two standard deviations of disconnections above the mean. A level one issue may be three standard deviations of disconnections above the mean.

If the monitoring application 105 discovers an unusually high amount of disconnections that exceeds one or more of the thresholds that is logged in the information data store 114, the monitoring application 105 will alert at least one of the plurality of workstations 116; the monitoring application 105 alerts the workstation 116 and gives it the most severe (level one) issue to fix.

Once the workstation 116 receives the alert from the monitoring application 105, an engineer that mans the workstation 116 may be assigned to fix the issue. In an embodiment, there are several methods of corrective action that the engineer may use to fix the disconnection issue. In an embodiment, the engineer may take correction action by moving the MQTT client to a different broker. In an embodiment, the engineer may take corrective action by also restarting or rebooting the broker. In an embodiment, the engineer may take corrective action by logging in to connect with the broker 106 to MQTT client 110 connection as it disconnects. In an embodiment, the engineer may take corrective action by examining log files in the information data store 114 to determine specific internet protocol addresses associated with disconnections. In an embodiment, the engineer may take corrective action by reassigning the MQTT client 110 to a different network or sub-network.

In an embodiment, for the head unit 126 and its MQTT client 128, if the disconnection count and/or disconnection rate between it and one of the plurality of brokers 106 is user impacting enough (level one issue) and is not fixed via the workstation 116, the engineer or a technician may be sent to fix the physical head unit 126 as there may be a problem with the head unit 126 and its MQTT client 128. In an embodiment, for the water meter 130 and its MQTT client 132, if the disconnection count and/or disconnection rate between it and one of the brokers 106 is severe enough (level one issue) and is not fixed via the workstation 116, the engineer or a technician may be sent to fix the physical water meter 130 unit. In an embodiment, for the Wi-Fi device 134 and its MQTT client 136, if the disconnection count and/or disconnection rate between it and one of the brokers 106 is severe enough (level one issue) and is not fixed via the workstation 116, the engineer or a technician may be sent to fix the physical Wi-Fi device 134 unit as there may be a problem with the physical Wi-Fi device 134 unit and its MQTT client 136.

Figure 2:
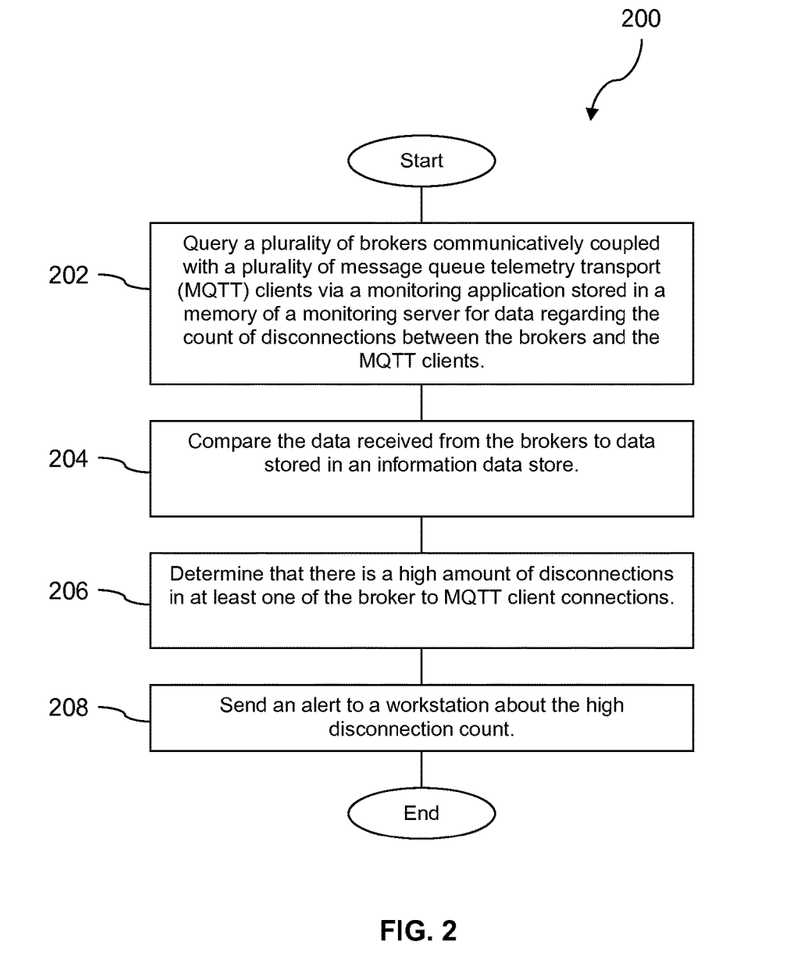
FIG. 2 is a flow chart of a method according to an embodiment of the disclosure.

In FIG. 2, a method 200 is described. At block 202, a monitoring application queries a plurality of brokers that are communicatively coupled to a plurality of message queue telemetry transport (MQTT) clients for data regarding the count of disconnections between the brokers and the MQTT clients. At block 204, the monitoring application compares the data received from the brokers to data that is logged in an information data store. In an embodiment, the monitoring application may convert the data on disconnections from the MQTT clients to a disconnection rate and may compare that disconnection rate to stored historical disconnection rate data. The stored historical disconnection rate data may take a number of different forms. The stored disconnection rate data may represent a rolling average of disconnection rates. The stored disconnection rate data may be determined based on a portion or segment of the disconnection data obtained from MQTT clients. For example the stored disconnection rate data may be segmented according to time interval, day of week, location, message broker, and/or other segmentation criteria.

At block 206, the monitoring application determines that there is a high amount of disconnections in at least one of the broker to MQTT client connections. At block 208, the monitoring application sends an alert to a workstation about the high disconnection count.

Figure 3:
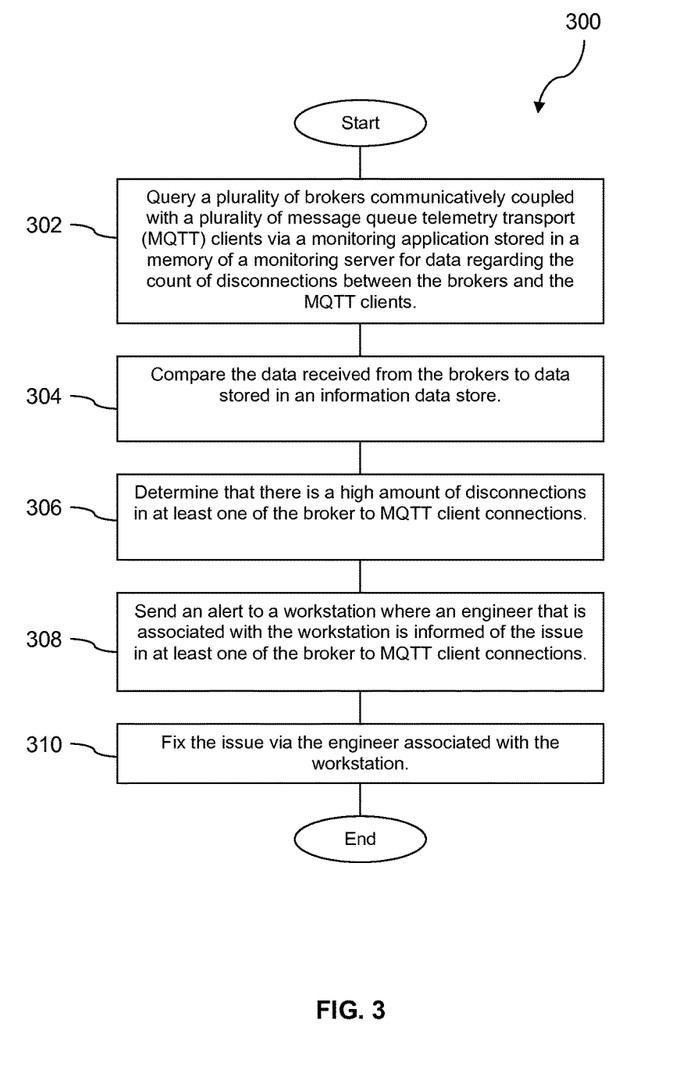
FIG. 3 is a flow chart of a method according to an embodiment of the disclosure.

In FIG. 3, a method 300 is described. At block 302, a monitoring application queries a plurality of brokers communicatively coupled with a plurality of message queue telemetry transport (MQTT) clients for data regarding the count of disconnections between the brokers and the MQTT clients. At block 304, the monitoring application compares the data received from the brokers to data that is stored in an information data store. At block 306, the monitoring application determines that there is a high amount of disconnections in at least one of the broker to MQTT client connections. At block 308, the monitoring application sends an alert to a workstation where an engineer that is associated with the workstation is informed of the issue in the at least one broker to MQTT client connections. At block 310, engineer at the workstation fixes the issue.

Figure 4:
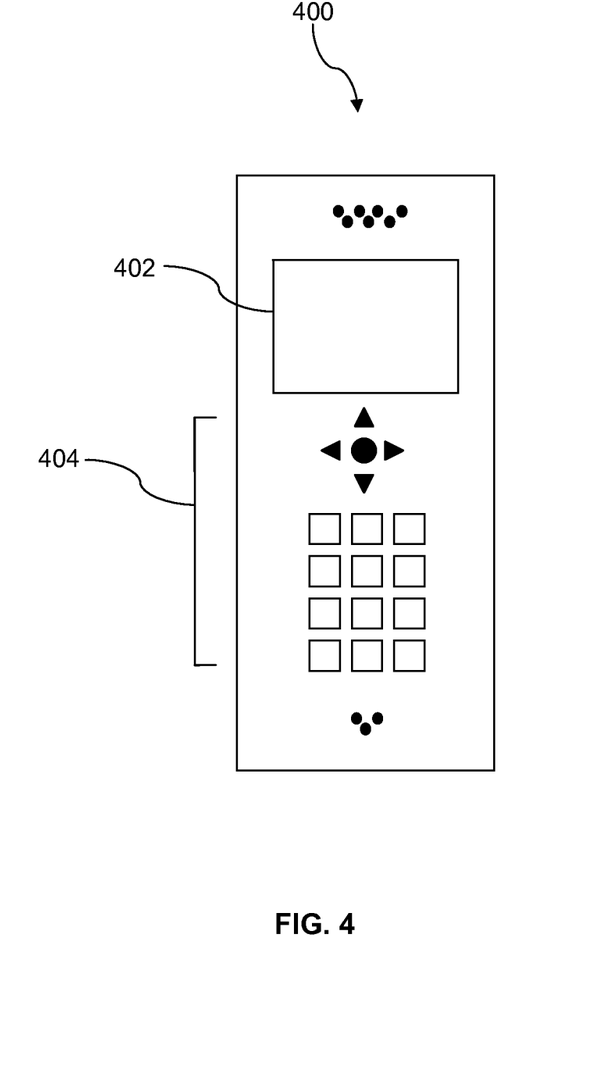
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
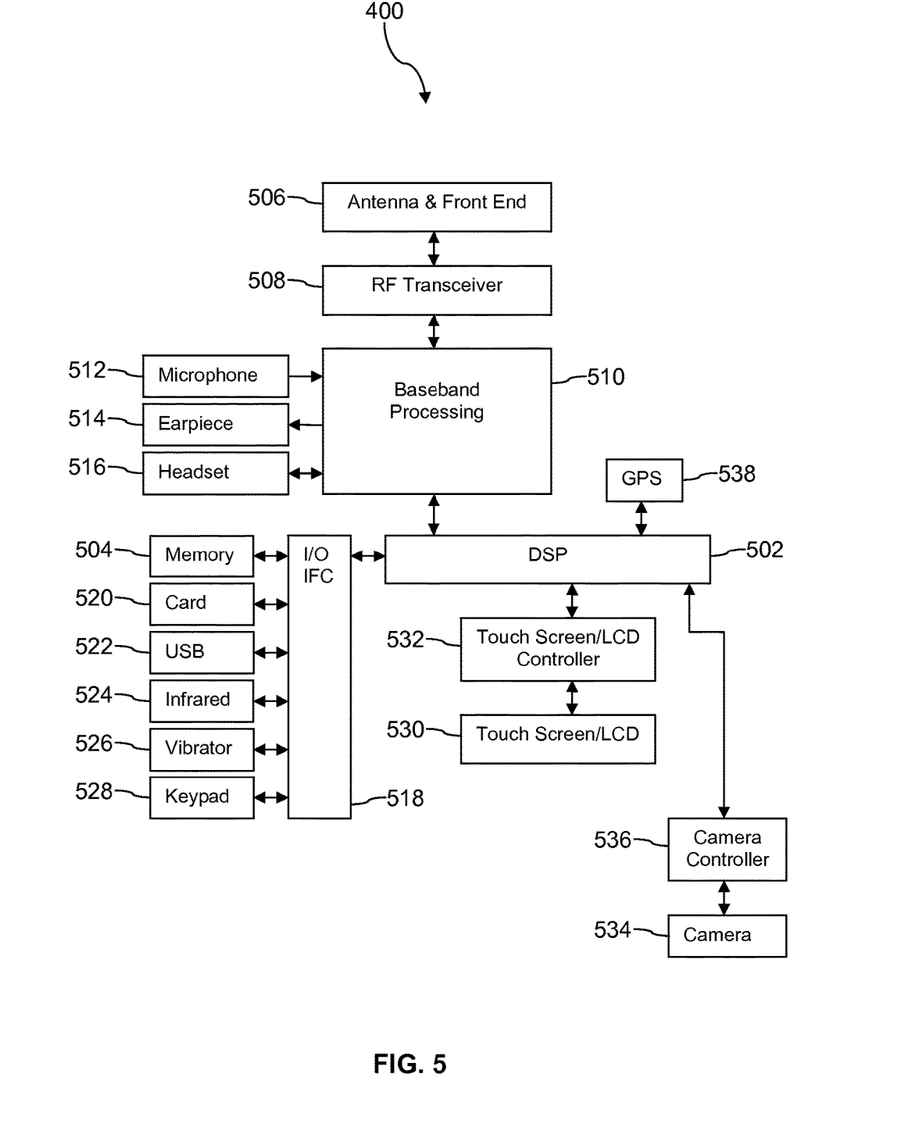
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
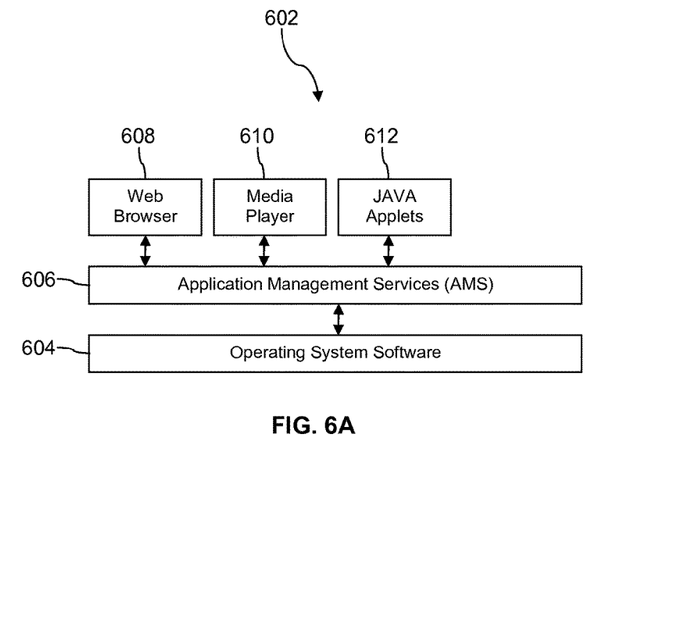
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA® applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA® applets 612 may be executed by the mobile device 400 to provide a variety of functionality including games, utilities, and other functionality.

Figure 6B:
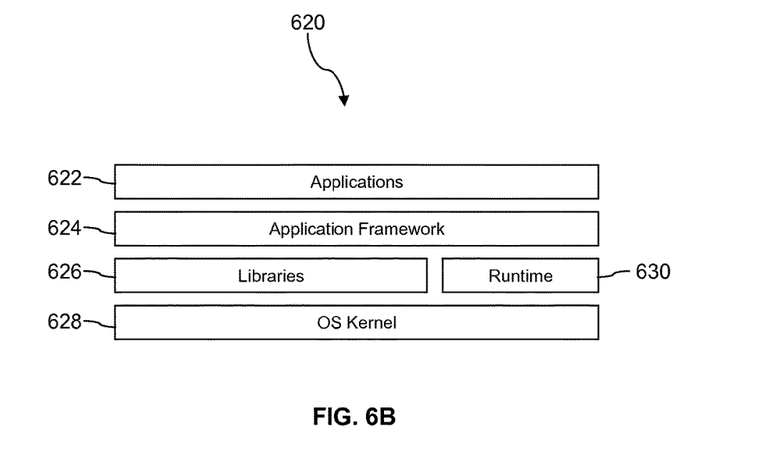

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
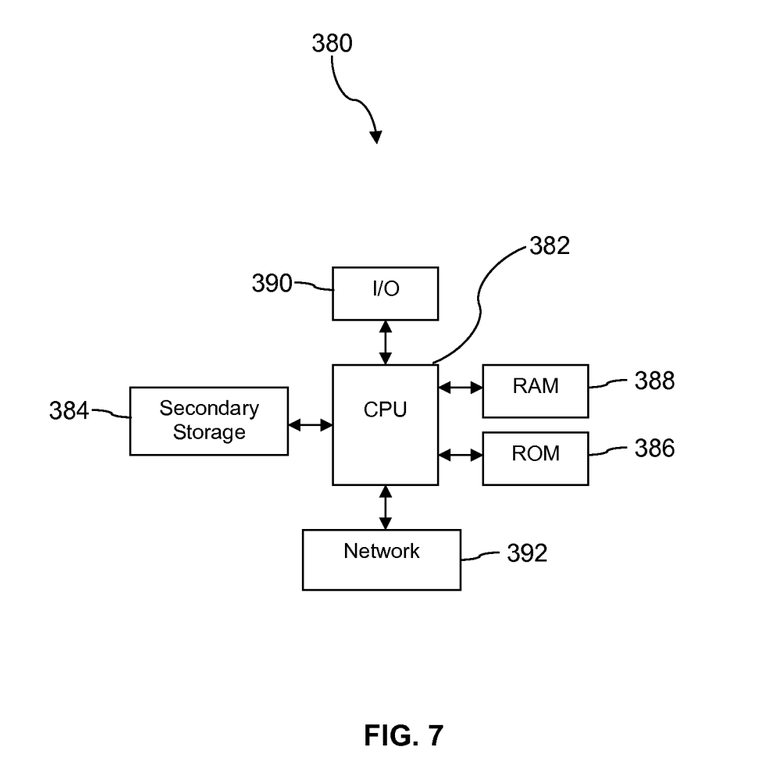
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX®), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An endpoint monitoring system for a machine to machine (M2M) messaging framework system, comprising:
   a processor;
   a non-transitory memory; and
   a monitoring application stored in the non-transitory memory that, when executed by the processor,
   periodically sends a query to a plurality of message queue telemetry transport (MQTT) messaging brokers requesting data associated with a count of disconnections between the plurality of MQTT messaging brokers and a plurality of MQTT clients executing in a plurality of different types of wireless endpoint devices,
   compares the count of disconnections determined from the data received from the plurality of MQTT messaging brokers to data stored in an information data store, wherein the data in the information data store comprises a historical count of disconnections between the plurality of MQTT messaging brokers and the plurality of MQTT clients, determines, based on the comparison, whether the determined count of disconnections between at least one of the plurality of MQTT messaging brokers and at least one of the plurality of MQTT clients exceeds a predefined threshold of disconnections, wherein the predefined threshold of disconnections is determined based on the historical count of disconnections and a plurality of factors including a MQTT messaging broker and at least two of a particular time of day, a particular day of week, an application, or a particular geographic area associated with the determined count of disconnections, wherein the historical count of disconnections of the predefined threshold is determined for a periodically cyclical previously occurring combination of the at least two of the particular time of day, the particular day of week, the application, or the particular geographic area corresponding to a current combination of the at least two of the particular time of day, the particular day of week, the application, or the particular geographic area associated with the determined count of disconnections, and wherein the predefined threshold of disconnections is different for different MQTT messaging brokers, and initiates corrective actions in response to a determination that the determined count of disconnections exceeds the predefined threshold of disconnections, wherein the corrective actions comprise rebooting the at least one of the plurality of MQTT clients with the determined count of disconnections that exceeds the predefined threshold and establishing a connection between a different MQTT messaging broker and the at least one of the plurality of MQTT clients with the determined count of disconnections that exceeds the predefined threshold.

2. The system of claim 1, wherein the monitoring application monitors at least 1 million connections between the plurality of MQTT messaging brokers and the plurality of MQTT clients.

3. The system of claim 1, wherein the monitoring application sends a query to the plurality of MQTT messaging brokers every five minutes.

4. The system of claim 3, wherein the monitoring application sends a query to the plurality of MQTT messaging brokers one of every minute, two minutes, 10 minutes, 30 minutes, or an hour.

5. The system of claim 1, wherein the data in the information data store is updated every three weeks.

6. The system of claim 1, wherein the system operates in a backend network-side system that monitors and controls the plurality of MQTT clients as frontend user-side endpoints at least partially based on the historical count of disconnections between the plurality of MQTT messaging brokers and the plurality of MQTT clients and the count of disconnections determined from the data received from the plurality of MQTT messaging brokers, where the plurality of MQTT messaging brokers are implemented in the backend network-side system.

7. A method of alerting for an endpoint monitoring for a machine to machine (M2M) messaging framework by a monitoring application stored in a non-transitory memory of a monitoring server and executable by a processor of the monitoring server, said method comprising:

periodically querying a plurality of message queue telemetry transport (MQTT) messaging brokers communicatively coupled with a plurality of MQTT clients for data regarding a count of disconnections between the plurality of MQTT messaging brokers and the plurality of MQTT clients executing in a plurality of different types of wireless endpoint devices;

comparing the count of disconnections determined from the data received from the plurality of MQTT messaging brokers to data stored in an information data store, wherein the data in the information data store comprises a historical count of disconnections between the plurality of MQTT messaging brokers and the plurality of MQTT clients;

determining whether the determined count of disconnections between at least one of the plurality of MQTT messaging brokers and at least one of the plurality of MQTT clients exceeds a predefined threshold of disconnections, wherein the predefined threshold of disconnections is determined based on the historical count of disconnections and a plurality of factors including an MQTT message broker and at least two of a particular time of day, a particular day of week, an application, or a particular geographic area associated with the determined count of disconnections, wherein the historical count of disconnections of the predefined threshold is determined for a periodically cyclical previously occurring combination of the at least two of the particular time of day, the particular day of week, the application, or the particular geographic area corresponding to a current combination of the at least two of the particular time of day, the particular day of week, the application, or the particular geographic area associated with the determined count of disconnections, and wherein the predefined threshold of disconnections is different for different MQTT messaging brokers; and sending an alert to a workstation and initiating corrective actions in response to a determination that the determined count of disconnections exceeds the predefined threshold of disconnections, wherein the corrective actions comprise rebooting the at least one of the plurality of MQTT clients with the determined count of disconnections that exceeds the predefined threshold and establishing a connection between a different MQTT messaging broker and the at least one of the plurality of MQTT clients with the determined count of disconnections that exceeds the predefined threshold.

8. The method of claim 7, wherein the data in the information data store is stored as an average disconnection rate data.

9. The method of claim 8, wherein an amount of disconnections per hour between the plurality of MQTT messages brokers and the plurality of MQTT clients is calculated by the monitoring application for comparison to the historical count of disconnections.

10. The method of claim 8, wherein a rate of disconnections over periods of time during different days is calculated by the monitoring application for comparison to the historical count of disconnections.

11. The method of claim 8, wherein a rate of disconnections based on a percentage of disconnections relative to an amount of active connections is calculated by the monitoring application for comparison to the historical count of disconnections.

12. The method of claim 7, further comprising assigning a priority level of a plurality of priority levels to each rate of a plurality of disconnection rates between the plurality of MQTT messaging brokers and the plurality of MQTT clients based on a percentage of disconnections that occur when compared to the data in the information data store, wherein the plurality of priority levels comprises a level three priority level, a level two priority level, and a level one priority level where the level three priority level represents a connection between a MQTT messaging broker and a MQTT client that is connecting greater than ninety-five percent of the time during connection (Current rate of connection>95%), the level two priority level represents a connection between a MQTT messaging broker and a MQTT client that is connecting less than ninety-five percent of the time, but greater than fifty percent of the time during connection (95%>Current rate of connection>50%), and the level one priority level represents a connection between a MQTT messaging broker and a MQTT client that is connecting less than fifty percent of the time during connection (50%>Current rate of connection).

13. The method of claim 12, wherein the priority level is assigned based on a mean rate of disconnections experienced between the MQTT messaging broker and the MQTT client, wherein the level three priority level is one standard deviation of disconnections above the mean, the second priority level is two standard deviations of disconnections above the mean, and the third priority level is three standard deviations of disconnections above the mean.

14. A method of addressing disconnection issues for an endpoint monitoring for a machine to machine (M2M) messaging system by a monitoring application stored in a non-transitory memory of a monitoring server and executable by a processor of the monitoring server, said method comprising:
 periodically sending a plurality of message queue telemetry transport (MQTT) messaging brokers communicatively coupled with a plurality of MQTT clients a request for data regarding a count of disconnections between the plurality of MQTT messaging brokers and the plurality of MQTT clients executing in a plurality of different types of endpoint devices;
 comparing the count determined from the data received from the plurality of MQTT messaging brokers to data stored in an information data store, wherein the data in the information data store comprises a historical count of disconnections between the plurality of MQTT messaging brokers and the plurality of MQTT clients;
 determining, based on the comparison, whether the determined count of disconnections between at least one of the plurality of MQTT messaging brokers and at least one of the plurality of MQTT clients exceeds a predefined threshold of disconnections, wherein the predefined threshold of disconnections is determined based on the historical count of disconnections and a plurality of factors including an MQTT messaging broker and at least two of a particular time of day, a particular day of week, an application, or a particular geographic area associated with the determined count of disconnections, wherein the historical count of disconnections of the predefined threshold is determined for a periodically cyclical previously occurring combination of the at least two of the particular time of day, the particular day of week, the application, or the particular geographic area corresponding to a current combination of the at least two of the particular time of day, the particular day of week, the application, or the particular geographic area associated with the determined count of disconnections, and wherein the predefined threshold of disconnections is different for different MQTT messaging brokers; and
 initiating corrective actions in response to a determination that the determined count of disconnections exceeds the predefined threshold of disconnections, wherein the corrective actions comprise rebooting the at least one of the plurality of MQTT clients with the determined count of disconnections that exceeds the predefined threshold and establishing a connection between a different MQTT messaging broker and the at least one of the plurality of MQTT clients with the determined count of disconnections that exceeds the predefined threshold.

15. The method of claim 14, wherein the plurality of different types of wireless endpoint devices comprise a head unit in a vehicle, a utility meter, and a mobile communication device.

16. The method of claim 14, wherein the corrective action further comprises determining specific Internet Protocol addresses associated with disconnections.

* * * * *